(12) United States Patent
Sonalkar

(10) Patent No.: US 7,916,802 B2
(45) Date of Patent: Mar. 29, 2011

(54) MULTIUSER ALLOCATION METHOD FOR MAXIMIZING TRANSMISSION CAPACITY

(75) Inventor: Ranjan V. Sonalkar, North Caldwell, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 0 days.

(21) Appl. No.: 12/624,110

(22) Filed: Nov. 23, 2009

(65) Prior Publication Data

US 2010/0067544 A1 Mar. 18, 2010

Related U.S. Application Data

(63) Continuation of application No. 12/204,098, filed on Sep. 4, 2008, now Pat. No. 7,623,584, which is a continuation of application No. 11/558,237, filed on Nov. 9, 2006, now Pat. No. 7,436,893, which is a continuation of application No. 10/113,507, filed on Apr. 1, 2002, now Pat. No. 7,151,803.

(51) Int. Cl.
    H04L 27/28 (2006.01)
(52) U.S. Cl. .......................................... 375/260; 375/222
(58) Field of Classification Search .................. 375/222, 375/259–261
    See application file for complete search history.

(56) References Cited

U.S. PATENT DOCUMENTS

| | | | |
|---|---|---|---|
| 4,467,441 A | 8/1984 | Gritton et al. | |
| 4,554,417 A | 11/1985 | Boyer | |
| 4,574,166 A | 3/1986 | Gritton | |
| 4,591,669 A | 5/1986 | Duttweiler et al. | |
| 4,628,157 A | 12/1986 | Chance et al. | |
| 4,679,227 A | 7/1987 | Hughes-Hartogs | |
| 4,731,834 A | 3/1988 | Duttweiler et al. | |
| 4,736,414 A | 4/1988 | Montagna et al. | |
| 5,001,701 A | 3/1991 | Gay | |
| 5,289,459 A | 2/1994 | Brownlie | |
| 5,289,539 A | 2/1994 | Maruyama | |
| 5,500,880 A | 3/1996 | Kellermann | |
| 5,519,731 A | 5/1996 | Cioffi | |
| 5,539,777 A | 7/1996 | Grube et al. | |
| 5,548,642 A | 8/1996 | Diethorn | |
| 5,566,167 A | 10/1996 | Duttweiler | |
| 5,572,527 A | 11/1996 | Still et al. | |
| 5,576,664 A | 11/1996 | Herold et al. | |
| 5,577,027 A | 11/1996 | Cheng | |
| 5,594,719 A | 1/1997 | Oh et al. | |
| 5,606,577 A | 2/1997 | Grube et al. | |
| 5,608,725 A | 3/1997 | Grube et al. | |
| 6,144,696 A | 11/2000 | Shively et al. | |
| 6,205,410 B1 | 3/2001 | Cai | |
| 6,259,746 B1 | 7/2001 | Levin et al. | |
| 6,292,515 B1 * | 9/2001 | Kao et al. | 375/260 |
| 6,393,052 B2 | 5/2002 | Sadjadpour et al. | |
| 6,408,033 B1 * | 6/2002 | Chow et al. | 375/260 |
| 2001/0055332 A1 * | 12/2001 | Sadjadpour et al. | 375/222 |
| 2003/0086514 A1 | 5/2003 | Ginis et al. | |

* cited by examiner

Primary Examiner — David B Lugo
(74) Attorney, Agent, or Firm — Larson Newman & Abel, LLP

(57) ABSTRACT

Disclosed is a method and computer-readable medium for bit and power allocation for modems sharing a common multi-carrier binder, including Discrete Multi-Tone (DMT) based Digital Subscriber Line (DSL) modems. In one preferred embodiment, the method includes the steps of initializing a modem by calculating loop-to-loop channel transfer functions and noise power spectral densities (PSDs) at a corresponding receiver, and taking into account cross-talk between loops in the process of allocation so as to maximize total data rates within the binder.

17 Claims, 3 Drawing Sheets

MULTIUSER ALLOCATION METHOD FOR MAXIMIZING TRANSMISSION CAPACITY

CROSS-REFERENCE TO RELATED APPLICATIONS

This application is a continuation of U.S. patent application Ser. No. 12/204,098 entitled "Multiuser Allocation Method for Maximizing Transmission Capacity," filed on Sep. 4, 2008, which is a continuation of U.S. patent application Ser. No. 11/558,237 filed on Nov. 9, 2006, now U.S. Pat. No. 7,436,893, which claims the benefit of U.S. patent application Ser. No. 10/113,507 filed Apr. 1, 2002, now U.S. Pat. No. 7,181,803, the disclosures of which are hereby expressly incorporated by reference in their entirety.

FIELD OF THE DISCLOSURE

The present invention relates to multi-carrier modem systems and, more particularly, to a method and system for allocating information bits and power so as to maximize data transmission capacity within a multi-carrier binder.

BACKGROUND

Digital Subscriber Line (DSL) technology greatly increases the digital capacity of an ordinary telephone line, allowing much more information to be channeled into a home or office receiver as well as providing for "always-on" operation. The speed that a DSL modem can achieve is a function of the distance between the receiver and a central office. Symmetric DSL (SDSL) is typically used for short connections that require high data rates in both upstream and downstream directions. SDSL utilizes only one cable pair and may be used with adaptive rates from 144 Kbps to 1.5 Mbps. High Bit Rate DSL (HDSL) is a symmetric technology that uses two twisted pairs for transmission distances up to about 12,000 feet. Each twisted pair can be used to provide T1 transmission, but such lines are typically not shared with analog telephone devices. Alternatively, HDSL-2 technology requires only one cable pair and provides transmission distances of about 18,000 feet.

Asymmetric DSL (ADSL) technology uses frequencies that are higher than voice, shares telephone lines, and is suitable for accessing the Internet. For ADSL applications, a Plain Old Telephone System (POTS) splitter may be installed at the receiver end to separate the voice frequencies and the ADSL frequencies. The 'G.lite' version of ADSL, alternatively known as 'ADSL lite,' 'Universal ADSL,' or 'splitter-less ADSL,' does not require a POTS splitter. Rather, telephone devices are connected to low-pass filters that remove the higher ADSL frequencies from the lower-frequency voice transmissions. In the current state of the art, ADSL is using Discrete Multi-tone (DMT) modulation and Carrierless Amplitude Phase (CAP) modulation.

Cables comprising twisted-pair transmission channels emanate from essentially all telephone company central offices. Such cables typically include binders containing groups of twenty-five or fifty tightly-packed twisted pairs. As can be appreciated by one skilled in the relevant art that this configuration results in crosstalk among twisted pairs in the same binder. There are nearly a billion such twisted pairs worldwide and the number is growing dramatically as nearly all new commercial and residential building developments continue to install twisted-pair lines for telephone service connection. This "installed copper base" of twisted pairs lines may indeed be the greatest infrastructure asset of the local telephone service provider.

In view of the fact that DSL technology can provide for many services over this installed copper base, the communication lines in a binder can be viewed as a service provider resource, much as the wireless spectrum is viewed as a resource. This resource needs fair management to provide the maximum competitive financial return and economic prosperity to all stakeholders in the broadband marketplace. Thus, in view of the valuable resource provided by the binder, unstructured use of the binder communication lines at the physical layer by uncoordinated competitive service providers becomes detrimental to the overall binder data carrying capacity.

In a typical binder containing twenty five or fifty twisted copper-pair lines, insulation between the lines provides only minimal shielding between copper loops in the high frequency band that is used by the various flavors of xDSL technologies. Accordingly, as the deployment of the various xDSL products has grown, the resulting interference into neighboring loops sharing the binder also continues to increase. Consequently, it has become clear that ever-increasing levels of interference in the binder present a limitation to xDSL product performance. The cross-talk caused by the signals transmitted on the loops, such as self-echo, near-end cross-talk (NEXT), and far-end cross-talk (FEXT), is dependent on the transmit signal power levels. In conventional xDSL applications, this cross-talk reduces the signal-to-noise ratio (SNR) since the cross talk acts as additional noise to the receiver.

In DMT-based ADSL modems, a selected bandwidth of 1.104 MHz is divided into 256 bins and the data bits are used for Quadrature Amplitude Modulation (QAM) in each bin. In DMT-based VDSL modems, a selected bandwidth of 17.664 MHz is divided into 4096 bins. Normally during the initialization period, each modem goes through a channel SNR estimation phase and data/power allocation phase, so as to maximize its own data rate. Because of the fact that each modem's transmission power leaks into other loops within the same binder, the leaked power adds to the noise detected by modems on the other loops. Moreover, if two modems happen to be sharing the same frequency band, then an increase in transmission power of one modem reduces the transmission data rate of the other shared-frequency-band modem. On the other hand, if the two modems were not sharing a common frequency band, then one modem's operation would have less of an adverse effect on the data rate of the other modem. As can be appreciated by one skilled in the art, if both modems were cooperating and jointly performed initial power allocation over available frequency bands, the resulting transmission data rate of the two modems would greater than the transmission data rates achieved if both modems were not cooperating.

Data rates can be increased utilizing a power control algorithm based on a single user as disclosed, for example, in a related technical article by Wei Yu, George Ginis, and John M. Cioffi, entitled "An adaptive multi-user power control algorithm," T1E.4 Contribution 01-200R3, August 2001. The core of the disclosed adaptive multi-user power control algorithm is an iterative water-filling procedure that effectively allocates transmission power among modem users and frequency bands when the power budget of each modem user is known. In the iterative water-filling procedure, multiple users take turns to allocate power based on the well-known water-filling method for a single user, taking into account the background noise and the cross-talk noise from other users, until the power allocation profile converges to equilibrium.

Thus, there is a particular need for a method which takes into account cross-talk among users in maximizing the total data rate achievable within a multi-carrier binder.

The present invention provides a method and computer readable medium for allocation of available power budget of each Discrete Multi-Tone (DMT)-based Digital Subscriber Line (DSL) modem to its DMT frequency tones, simultaneously, over a collection of all 'cooperating' DSL modems that share a common binder. The method includes the steps of: initializing the DMT-based DSL modems by calculating the frequency-dependent values of channel attenuations, loop-to-loop cross-talk coefficients, and noise power spectral densities (PSDs) at all receivers, and using an iterative process to allocate power and bits to the frequency bins of all the cooperating modems such that the data rate totaled over all the modems is maximized for the pre-assigned power budgets for each of the modems. The disclosed method allocates the power considering all the users simultaneously rather than allocating the power sequentially from user to user and also functions within constraints imposed by the Standards Organizations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention:

DETAILED DESCRIPTION

Figure 1:
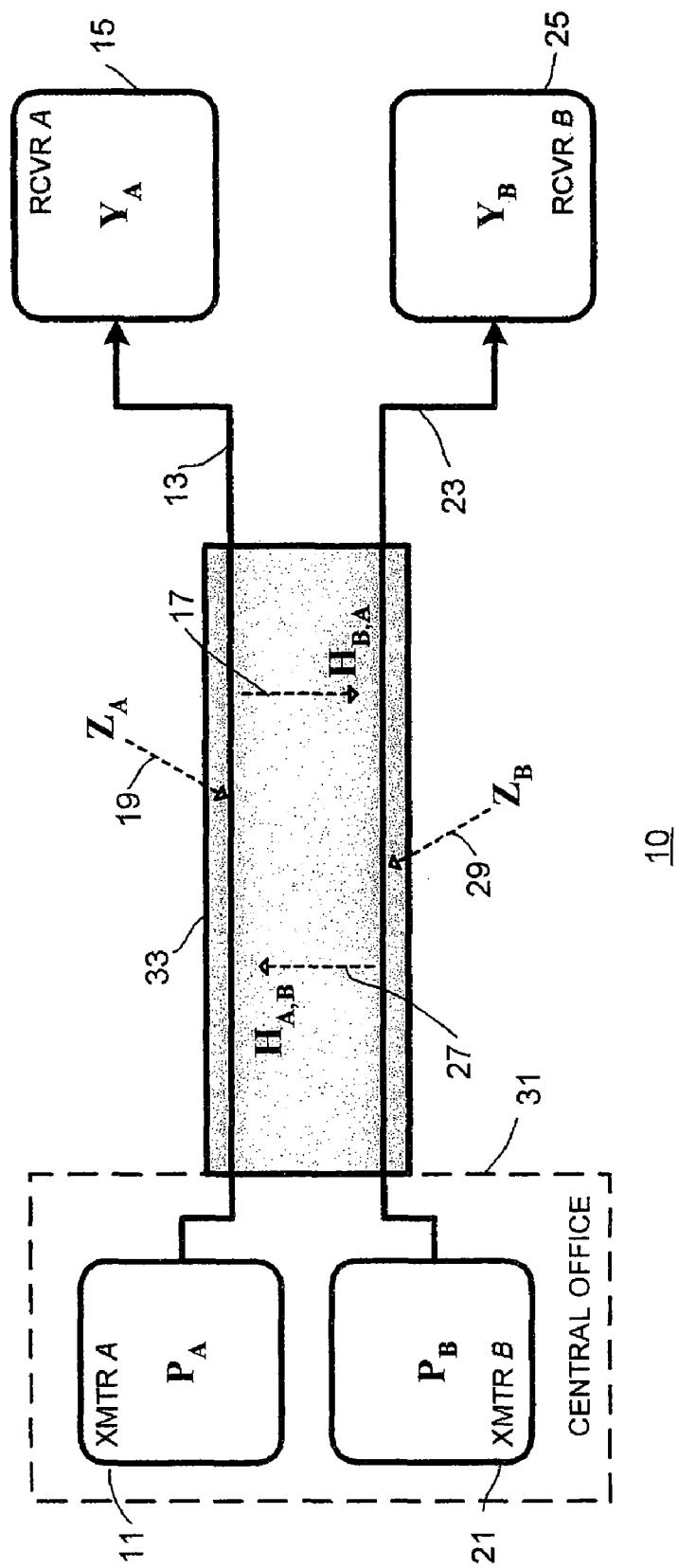
FIG. 1 is a simplified functional diagram of a conventional discrete multi-tone-based digital subscriber system.

There is shown in FIG. 1 a simplified functional diagram of a conventional discrete multi-tone-based digital subscriber system 10 including a central office 31 such as may be provided by a local telephone company. The central office 31 includes a plurality of transmitters or modems, exemplified by central office modems 11 and 21. In the example provided, the central office modem 11 communicates with a customer receiver or modem 15 via communication link 13 and the central office modem 21 communicates with a customer receiver or modem 25 via communication link 23.

This duplex transmission configuration results in a certain amount of signal leakage between the communication links 13 and 23. For example, signals transmitted to the customer modem 15 induce cross-talk 27 having coefficient $H_{A,B}$) in the communication link 13. Moreover, background noise 10 ($Z_A$) and 29 ($Z_B$) appear on the respective communication links 13 and 23. The calculation of transmission source power levels $P_A$ and $P_B$ needed at the central office 31 for specific bit-error rates are coupled to respective receiver signal power levels $Y_A$ and $Y_B$ required at the customer premise 30.

Existing telephone loops can be adapted to provide broadband access using DSL technology. The dominant impairment in such DSL communication methods typically results from the electromagnetic coupling occurring between neighboring twisted pair lines. Traditional approaches to prevent the failure of a DSL system due to the cross-talk are based on the single-user system design. That is, a criterion used to limit the power level of a particular telephone loop or carrier is determined by the worst-case cross-talk induced in other loops.

It can be appreciated that, because the channel characteristics of DSL loops typically change more slowly than channel parameters of a wireless network, it becomes possible to acquire fairly accurate channel information for DSL lines and advantageously model the DSL loop as an interference channel. This approach allows the channel information to be used more effectively in allocating power among multiple user carriers and frequency bands, in comparison to a single-user system method.

Figure 2:
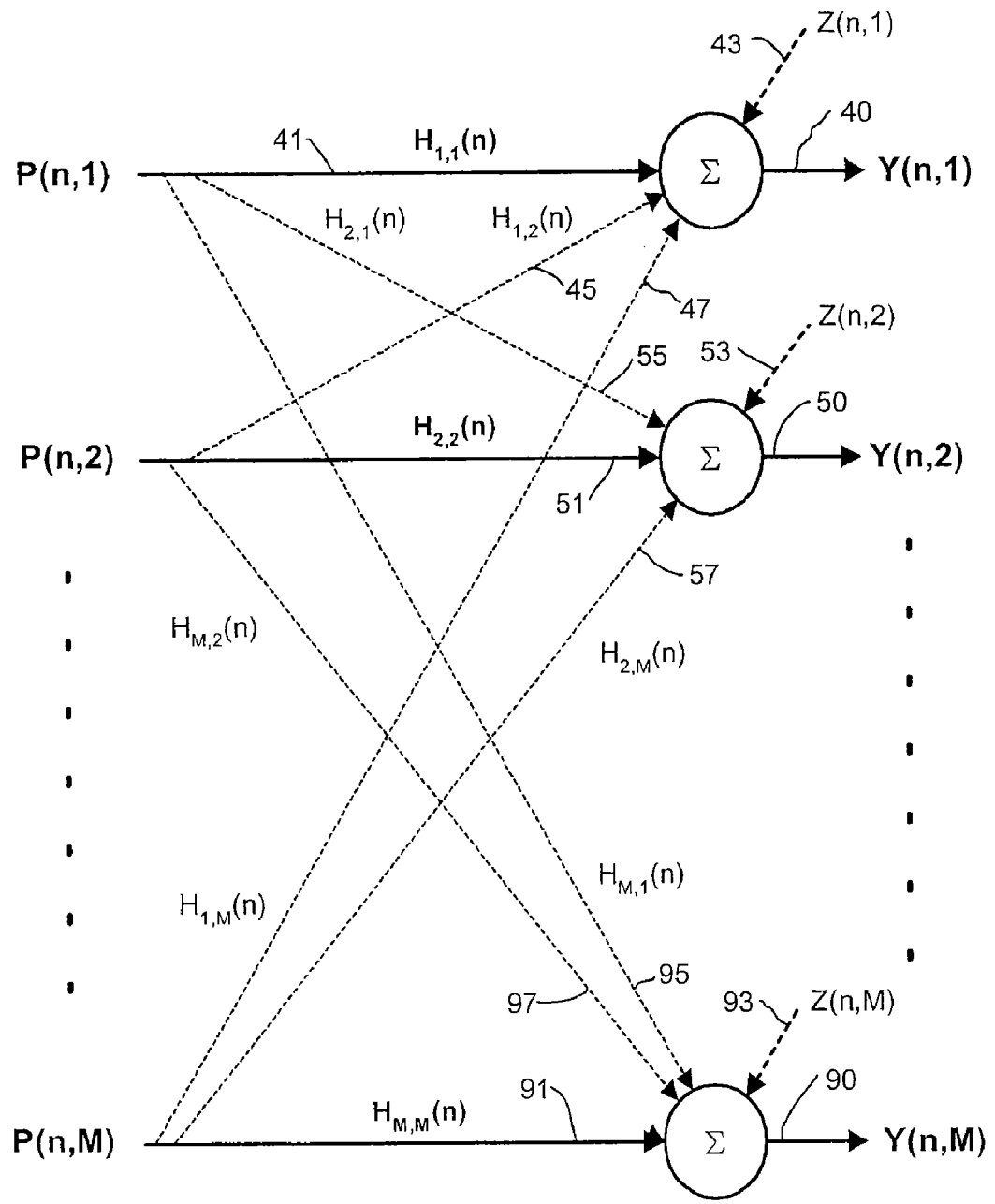
FIG. 2 is a generalized diagram showing a DSL channel with M transmitters and M receivers modeled as an M-input and M-output interference channel.

A typical DSL configuration may include twenty-five to fifty twisted pairs bundled as a group of communication lines, herein represented by a binder 33. As can be appreciated by one skilled in the relevant art, the electromagnetic field generated by a twisted pair in the binder 33 provides causes cross-talk signals, particularly on other pairs within the binder 33. These interactions can be illustrated in greater detail with reference to FIG. 2 in which a DSL channel with M transmitters and M receivers can be modeled as an M-input and M-output (MIMO) interference channel. Each user's channel comprises an inter-symbol interference (ISI) channel divided into N independent sub-channels in discrete multitone (DMT) systems. Thus, the DMT-based DSL channel with M users consists of N independent sub-channels, where N is equal to the number of DMT tones to which data must be assigned for each modem. The M transmitters operate at respective power levels of P(n,1), P(n,2), ..., P(n,M), where $0 \leq n \leq N$.

Each DMT tone can be modeled as an interference channel having the following channel matrix:

$$H_n = \begin{bmatrix} H_{1,1}(n) & H_{1,2}(n) & \ldots & H_{1,M}(n) \\ H_{2,1}(n) & H_{2,2}(n) & \ldots & H_{2,M}(n) \\ \vdots & \vdots & \ddots & \vdots \\ H_{M,1}(n) & H_{M,2}(n) & \ldots & H_{M,M}(n) \end{bmatrix} \quad (1)$$

where the diagonal term $H_{i,j}(n)$ is a channel gain coefficient for user i, and the off-diagonal term $H_{i,j}(n)$ is a channel cross-talk coefficient representing signal coupling from user j to user i in sub-channel DMT-frequency bin n. Using this nomenclature, a receiver signal power level 40, designated as Y(n,1) transmitted to a first user includes received transmission 41, designated as $H_{1,1}^2(n)P(n,1)$, and back ground noise 43, designated as Z(n,1). the receiver signal power Y(n,1) also includes a plurality of cross-talk signals from other user communication links, exemplified by a cross-talk signal 45, designated as $H_{1,2}^2(n)P(n,2)$, from a second user and a cross-talk signal 47, designated as $H_{1,M}^2(n)P(n,M)$, from an $M^{th}$ user.

Similarly, a receiver signal power level 50, designated as Y(n,2), transmitted to the second user includes received transmission source power 51, designated as $H_{2,2}^2(n)P(n,2)$, and background noise 53, designated as Z(n,2). The receiver signal power Y(n,2) also includes a plurality of cross-talk signals, exemplified by a cross-talk signal 55, designated as $H_{2,1}^2,(n)P(n,1)$, from the first user and a cross-talk signal 57, designated as $H_{2,M}^2(n)P(n,M)$, from the $M^{th}$ user. The $M^{th}$ receiver signal power level 90, designated as Y(n,M), includes received transmission source power 91, $H_{M,1}^2(n)P(n,M)$, background noise 93, Z(n,M), cross-talk signal 95, $H_{M,1}^2(n)P(n,1)$, and cross-talk signal 97, $H_{M,2}^2(n)P(n,2)$.

The disclosed method addresses the allocation of power in each modem so as to maximize the total capacity of the binder 33. In this case, the total noise power spectral density function of user i in sub-channel n is the sum of the background noise power $Z(n,i)$ and the cross-talk caused by other communication links in the binder 33, $$\text{Noise Power }(n, i) = Z(n, i) + \sum_{j=1, j\neq i}^{M} H_{i,j}^2(n) \cdot P(n, j) \quad (2)$$

where $P(n,j)$ and $Z(n,i)$ are the transmit signal power of user j and the background noise power of receiver i in sub-channel n, respectively. The signal to noise ratio $S(n,i)$ at receiver i in sub-channel n can be expressed as, $$S(n, i) = \frac{H_{i,i}^2(n) \cdot P(n, i)}{Z(n, i) + \sum_{j=1, j\neq i}^{M} H_{i,j}^2(n) \cdot P(n, j)}. \quad (3)$$

By assuming, that all the transmitted signals and the background noise are Gaussian, the number of bits that can be transmitted in sub-channel n from transmitter i to receiver i is given by, $$b(n, i) = \log_2\left(1 + \frac{S(n, i)}{\Gamma}\right) \quad (4a)$$

$$= \log_2\left(1 + \frac{H_{i,i}^2(n) \cdot P(n, i)}{\Gamma \cdot \left(Z(n, i) + \sum_{j=1, j\neq i}^{M} H_{i,j}^2(n) \cdot P(n, j)\right)}\right) \quad (4b)$$

where $\Gamma$ is the signal-to-noise ratio gap. The data rate of user I can be found by summing the bit rates in all N channels to give, $$R_i = \frac{1}{T_s}\sum_{n=1}^{N} b(n, i) \quad (5a)$$

$$= \frac{1}{T_s}\sum_{n=1}^{N} \log_2\left(1 + \frac{H_{i,i}^2(n) \cdot P(n, i)}{\Gamma \cdot \left(Z(n, i) + \sum_{j=1, j\neq i}^{M} H_{i,j}^2(n) \cdot P(n, j)\right)}\right) \quad (5b)$$

where $$\frac{1}{T_s}$$

is the symbol rate.

The disclosed method maximizes binder capacity over an available frequency bandwidth subject to a power budget constraint $P_{budget}(i)$, a power mask constraint $P_{mask}(n)$, and a 'bit-cap' constraint $b_{max}(n)$ for each user carrier. Using the channel matrix terms $H_{i,j}(n)$ and the background noise power spectral density function $Z(n,i)$, the transmit signal powers are advantageously distributed among the N sub-channels such that the summation of the data rates of all the user carriers is maximized:

$$\max \sum_{i=1}^{M} R_i = \quad (6a)$$

$$\max \frac{1}{T_s}\sum_{i=1}^{M}\sum_{n=1}^{M}\left[\log_2\left(1 + \frac{H_{i,i}^2(n) \cdot P(n, i)}{\Gamma \cdot \left(Z(n, i) + \sum_{j=1, j\neq i}^{M} H_{i,j}^2(n) \cdot P(n, j)\right)}\right)\right]$$

subject to $$\sum_{n+1}^{N} P(n, i) \leq P_{budget}(i) \text{ for } i = 1, \ldots, M \quad (6b)$$

$$0 \leq P(n, i) \leq P_{mask}(n) \text{ for } i = 1, \ldots, M; n = 1, \ldots, N \quad (6c)$$

$$b(n, i) \leq b_{max}(n) \text{ for } i = 1, \ldots, M; n = 1, \ldots, N \quad (6d)$$

where [X] is defined as the largest integer that is not greater than X, $P_{budget}(i)$ is the power budget of user i, $P_{mask}(n)$ is the power mask constraint in the sub-channel n, and $b_{max}(n)$ is the bit cap constraint in the sub-channel n. As is understood by one skilled in the relevant art, when a theoretical solution to equation (6) produces a non-integer bit allocation, an integer bit allocation approximating the non-integer solution is preferably used in a physical system such as the discrete multi-tone-based digital subscriber system 10, in FIG. 1

Equation (3) can be rearranged and expressed as $$y_n = A_n x_n \quad (7)$$

where $$y_n = [S(n, 1)Z(n, 1)S(n, 2)Z(n, 2) \ldots S(n, M)Z(n, M)]^T \quad (8)$$

$$A_n = \begin{bmatrix} H_{1,1}^2(n) & -S(n, 1)H_{1,2}^2(n) & \ldots & -S(n, 1)H_{1,M}^2(n) \\ -S(n, 2)H_{2,1}^2(n) & H_{2,2}^2(n) & \ldots & -S(n, 2)H_{2,M}^2(n) \\ \vdots & \vdots & \ddots & \vdots \\ -S(n, M)H_{M,1}^2(n) & -S(n, M)H_{M,2}^2(n) & \ldots & H_{M,M}^2(n) \end{bmatrix} \quad (9)$$

$$x_n = [P(n, 1)P(n, 2) \ldots P(n, M)]^T \quad (10)$$

Figure 3:
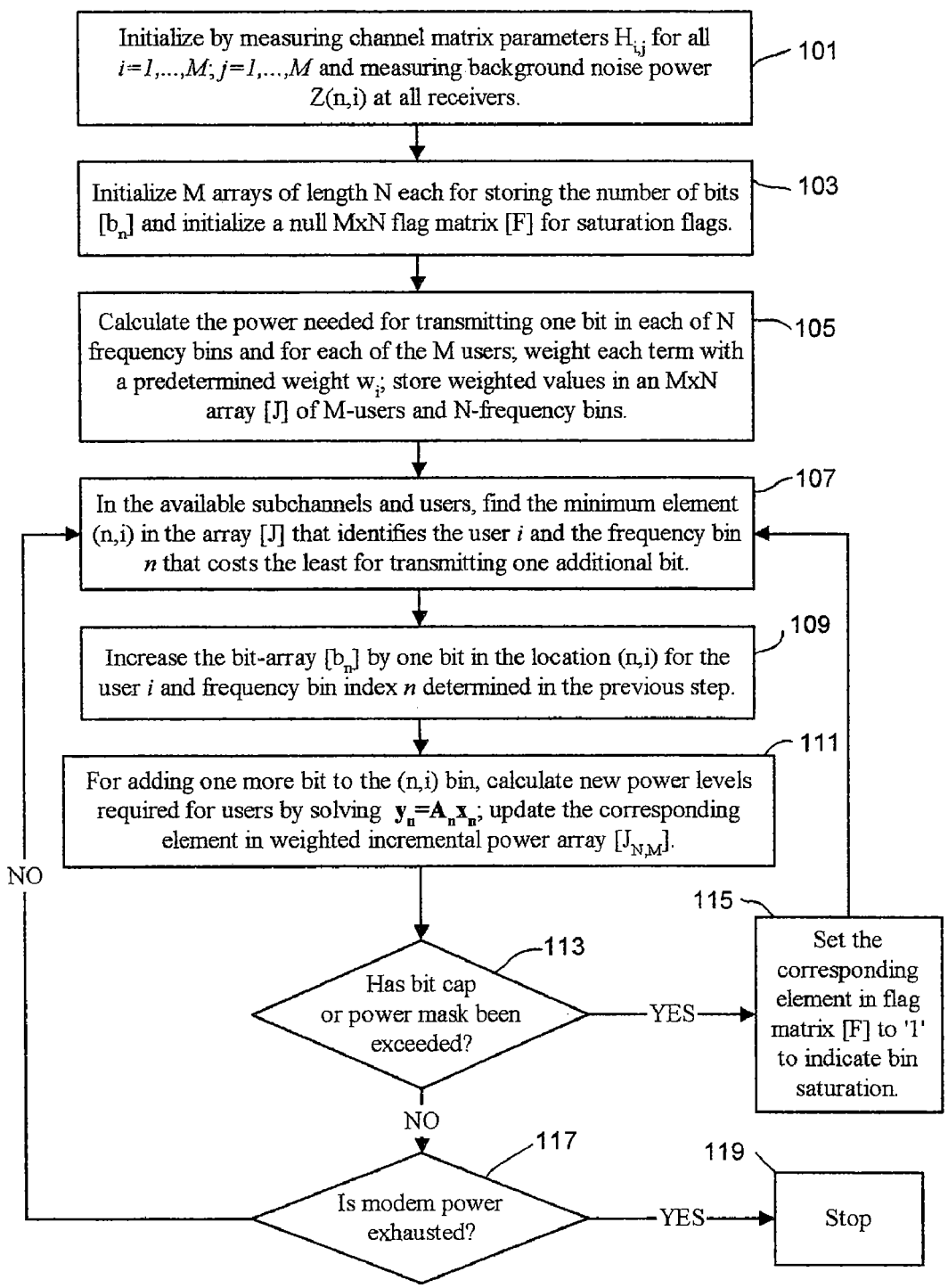
FIG. 3 is a flow diagram illustrating a preferred method of allocating bits and power in the DSL channel of FIG. 2.

The disclosed method for allocating power among users and frequency bands can be described in greater detail with reference to the flow diagram of FIG. 3. Initial parameters are obtained, at step 101, by measuring the channel matrix parameters $H_{i,j}(n)$ found in equation (3) above, and by measuring the background noise parameter terms $Z(n,i)$.

A series of bit allocation matrices $b_n$, one for each user I, are initialized, at step 103:

$$[b_n]_i = [0_1\ 0_2\ \ldots\ 0_N]^T \text{ for } i=1, \ldots, N \quad (11)$$

A null flag matrix [F] of size M×N is initialized for use in maintaining a set of system flags:

$$[F_{N,M}]_0 = \begin{bmatrix} 0_{1,1} & 0_{1,2} & \ldots & 0_{1,M} \\ 0_{2,1} & 0_{2,2} & \ldots & 0_{2,M} \\ \vdots & \vdots & \ddots & \vdots \\ 0_{N,1} & 0_{N,2} & \ldots & 0_{N,M} \end{bmatrix} \quad (12)$$

At step 105, the power required to transmit one bit in each of the N frequency bins and for each of the M users is calculated using the expression:

$$J(n, i) = w_i \cdot \frac{S(n, i) \cdot Z(n, i)}{H_{i,i}^2(n)} \text{ for } n = 1, \ldots, N; i = 1, \ldots M. \quad (13)$$

Each power value has been weighted with a predetermined weight factor $w_i$, where $0 \leq w_i \leq 1$. The weighted values are then stored in the weighted incremental power array given by:

$$[J_{N,M}] = \begin{bmatrix} J_{1,1} & J_{1,2} & \ldots & J_{1,M} \\ J_{2,1} & J_{2,2} & \ldots & J_{2,M} \\ \vdots & \vdots & \ddots & \vdots \\ J_{N,1} & J_{N,2} & \ldots & J_{N,M} \end{bmatrix} \quad (14)$$

The terms $H_{i,j}$ and $Z(n,i)$ in equation (13) can be measured at subscriber system initiation. From equation (4) the signal-to-noise ratio $S(n,i)$ can be represented as a function of the number of bits transmitted by the receiver i in the sub-channel n, $S(n,i)=\text{GAMMA}\cdot(2^{b(n,i)}-1)$ (15)

$$S(n,i)=\Gamma \cdot (2^{b(n,i)}-1) \quad (15)$$

Using equations (8), (9), and (15), $A_n$ and $y_n$ can be determined once the transmission bits $b(n,i)$, the channel cross-talk coefficients $H_{i,j}(n)$, and the background noise $Z(n,i)$ parameters have been derived.

The minimum element (n,i) used to select the user and the frequency bin that costs the least for transmitting one additional bit is determined, in step 107. If a flag has been set in the flag matrix [F], the corresponding flagged element is not included among the available sub-channels and users in this determination. The minimum element (n,i) can represented by the expression:

$$(n, i) = \arg\left\{ \min_{(m,j); F_{m,j}=0} J(m, j) \right\}. \quad (16)$$

The necessary power of each user to transmit $b_n=[b(n,1)b(n,2)\ldots b(n,M)]^T$ bits in sub-channel n can then be calculated by solving the linear equation (7) for $x_n$.

In step 109, the bit count in sub-channel n is increased by one bit for user i if none of the power budget constraint $P_{budget}(i)$, power mast constraint $P_{mask}(n)$, or 'bit-cap' constraint $b_{max}(n)$ has been exceeded, $$b_n \Leftarrow b_n + e_i. \quad (17)$$

For the multi-user application, a 'greedy algorithm' is used to increase one bit in the sub-channel n, for the selected user i, which requires least incremental power to transmit one more bit. In such multi-user integer bit-loading, the P(n,j) values are changed for $j=i \ldots, M; j \neq i$, in addition to the P(n,i) values. That is because the bit count for the selected user I has been increased, the power levels for the non-selected users need to be increased to offset increased cross-talk and maintain the desired bit-error rate for the other users transmitting b(n,j) bits for $j=1 \ldots M; j \neq i$ in the sub-channel n. As can be appreciated by one skilled in the art, the step of increasing the power of one user (i.e., of user i) results in an increase in the cross-talk to other users (i.e., to user sj for $j=1 \ldots, M; j \neq i$).

Thus, the cost function provided by $[J_{N,M}]$ in equation (14) above is used to effectively represent the incremental powers incurred by all the users j to increase one bit of a the particular user i. In a preferred embodiment, the cost function value J(n,i) for increasing one bit of user i in sub-channel n is selected to be a weighted sum of the incremental powers of all the users, such as given by the expression:

$$J(n,i)=w \cdot (x_n(b_n+e_i)-x_n(b_n)), \quad (18)$$

where $w=[w_1 w_2 \ldots w_M]^T$ is a pre-selected weight vector containing a weight for each user, $e_i$ is a unit vector whose $i^{th}$ element is unity and all other elements are zero, and $x_n(b_n)$, denotes the necessary power to transmit $b_n$ bits in the sub-channel n. The weight vector can be determined by the central office or by another initialization operator. Weighting values can be inversely proportional to the power remaining in the corresponding channel, for example, so as to spread out bit distribution among users and avoid rapid channel saturation.

In step 111, the cost of increasing one bit for every user in sub-channel n is updated. This is preferably done by solving equation (7) and then updating the corresponding cost function value J(n,j) using the weight vector to give:

$$J(n,j)=w \cdot (x_n(b_n+e_j)-x_n(b_n)), \text{for } j=1 \ldots, M \quad (19)$$

In decision block 113, the power value $x_n(b_n)$ is checked against the power mask constraint $P_{mask}(n)$ and the bit count $b_n$ is checked against the bit cap constraint $b_{max}(n)$. The corresponding flag in the flag matrix [F] is set (i.e., $F_{n,i}=1$), at step 115, if either of the power mask or bit count constraints is met or exceeded, indicating that sub-channel n is no longer available to increase one bit of user I, and operation returns to step 107.

If neither the bit cap constraint nor the power mask constraint has been met or exceeded, at decision block 113, a query is made, at decision block 117, as to whether there are remaining powers for all users. If modem power is not exhausted, then operation returns to step 107. If modem power has been exhausted, the bit and power allocation process is ended, at step 119.

While the invention has been described with reference to a preferred embodiment, it will be understood by those skilled in the relevant art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a digital subscriber system comprising a group of cooperating modems conducting communications via a shared multicarrier binder, a method comprising:
   iteratively allocating power and bits to frequency bins among the group of cooperating modems so as to maximize a total data rate for the group of cooperating modems subject to a predetermined criteria;
   determining, for each cooperating modem, a corresponding total incremental power comprising a sum of a power required by the cooperating modem to transmit an additional number of bits in a select frequency bin and a power required by the other cooperating modems of the group to compensate for interference resulting from the transmission of the additional number of bits in the select frequency bin by the cooperating modem;
   identifying a cooperating modem having the lowest corresponding total incremental power for the select frequency bin; and
   allocating the additional number of bits to the identified cooperating modem for the select frequency bin.

2. The method of claim 1, wherein identifying the cooperating modem having the lowest corresponding total incremental power comprises identifying the cooperating modem subject to at least one of a power budget constraint, a power spectral density mask constraint, and a bit-cap constraint.

3. The method of claim 1, wherein the additional number of bits is one bit.

4. The method of claim 1, wherein the additional number of bits is two or more bits.

5. The method of claim 1, wherein the sum comprises a weighted sum that is a function of a separate weight factor for each cooperating modem of the group.

6. The method of claim 5, wherein the weighted sum further is a function of a measured signal-to-noise ratio in the select frequency bin.

7. The method of claim 1, wherein:
the predetermined criteria comprises a predetermined maximum bit count for a select frequency bin for a select cooperating modem of the group; and
iteratively allocating power and bits to frequency bins among the cooperating modems comprises ceasing consideration of the select cooperating modem for allocation of one or more additional bits to the select frequency bin responsive to a number of bits allocated to the select cooperating modem reaching the predetermined maximum bit count.

8. The method of claim 1, wherein:
the predetermined criteria comprises a predetermined power spectral density mask constraint; and
iteratively allocating power and bits to frequency bins among the cooperating modems comprises ceasing consideration of the select frequency bin for allocation of one or more additional bits responsive to a power allocated to the select frequency bin reaching the predetermined power spectral density mask constraint.

9. The method of claim 1, wherein the group of cooperating modems is located at a central office of a service provider in the digital subscriber system.

10. In a digital subscriber system comprising a group of cooperating modems conducting communications via a shared multicarrier binder, a non-transitory processor-readable medium embodying executable instructions that, when executed by a computer, cause the computer to:
iteratively allocate power and bits to frequency bins among the group of cooperating modems so as to maximize a total data rate for the group subject to a predetermined criteria; wherein the executable instructions that, when executed by the computer, cause the computer to iteratively allocate power and bits to frequency bins among the cooperating modems comprise executable instructions that, when executed by the computer, cause the computer to:
determine, for each cooperating modem, a corresponding total incremental power comprising a sum of a power required by the cooperating modem to transmit an additional number of bits in a select frequency bin and a power required by the other cooperating modems of the group to compensate for interference resulting from the transmission of the additional number of bits in the select frequency bin by the cooperating modem;
identify the cooperating modem having the lowest corresponding total incremental power for the select frequency bin; and
allocate the additional number of bits to the identified cooperating modem for the select frequency bin.

11. The non-transitory processor-readable medium of claim 10, wherein the executable instructions that, when executed by the computer, cause the computer to identifying the cooperating modem having the lowest corresponding total incremental power comprise executable instructions that, when executed by the computer, cause the computer to identify the cooperating modem subject to at least one of a power budget constraint, a power spectral density mask constraint, and a bit-cap constraint.

12. The non-transitory processor-readable medium of claim 10, wherein the additional number of bits is one bit.

13. The non-transitory processor-readable medium of claim 10, wherein the sum comprises a weighted sum that is a function of a separate weight factor for each cooperating modem of the group.

14. The non-transitory processor-readable medium of claim 13, wherein the weighted sum further is a function of a measured signal-to-noise ratio in the select frequency bin.

15. The non-transitory processor-readable medium of claim 10, wherein:
the predetermined criteria comprises a predetermined maximum bit count for a select frequency bin for a select cooperating modem of the group; and
wherein the executable instructions that, when executed by the computer, cause the computer to iteratively allocate power and bits to frequency bins among the cooperating modems comprise executable instructions that, when executed by the computer, cause the computer to cease consideration of the select cooperating modem for allocation of one or more additional bits to the select frequency bin responsive to a number of bits allocated to the select cooperating modem reaching the predetermined maximum bit count.

16. The non-transitory processor-readable medium of claim 10, wherein:
the predetermined criteria comprises a predetermined power spectral density mask constraint; and
wherein the executable instructions that, when executed by the computer, cause the computer to iteratively allocate power and bits to frequency bins among the cooperating modems comprise executable instructions that, when executed by the computer, cause the computer to cease consideration of the select frequency bin for allocation of one or more additional bits responsive to a power allocated to the select frequency bin reaching the predetermined power spectral density mask constraint.

17. The non-transitory processor-readable medium of claim 10, wherein the digital subscriber system comprises a central office of a service provider, the central office comprising the group of cooperating modems.

* * * * *